(12) United States Patent
Song

(10) Patent No.: US 10,792,884 B2
(45) Date of Patent: Oct. 6, 2020

(54) COMPOSITE PANEL SANDWICH STRUCTURES WITH INTEGRATED JOINTS

(71) Applicant: The Boeing Company, Chicago, IL (US)

(72) Inventor: Weidong Song, Woodinville, WA (US)

(73) Assignee: The Boeing Company, Chicago, IL (US)

(*) Notice: Subject to any disclaimer, the term of this patent is extended or adjusted under 35 U.S.C. 154(b) by 405 days.

(21) Appl. No.: 15/623,521

(22) Filed: Jun. 15, 2017

(65) Prior Publication Data

US 2018/0361700 A1   Dec. 20, 2018

(51) Int. Cl.
*B32B 3/12* (2006.01)
*B32B 37/12* (2006.01)
(Continued)

(52) U.S. Cl.
CPC .............. *B32B 3/12* (2013.01); *B29C 65/483* (2013.01); *B29C 65/4855* (2013.01); *B29C 65/5057* (2013.01); *B29C 66/02241* (2013.01); *B29C 66/1122* (2013.01); *B29C 66/1142* (2013.01); *B29C 66/43421* (2013.01); *B29C 66/43441* (2013.01); *B29C 66/45* (2013.01); *B29C 66/721* (2013.01); *B29C 66/7254* (2013.01); *B29C 66/72525* (2013.01); *B29C 69/001* (2013.01); *B29D 24/005* (2013.01); *B29D 99/0021* (2013.01); *B32B 5/18* (2013.01);
(Continued)

(58) Field of Classification Search
CPC ....... B32B 3/12; B32B 2305/024; B32B 5/18; B32B 2305/022; B32B 2266/06; B32B 2266/08; B32B 2266/14; B29C 66/72525; B29C 66/7254; B29C 66/727; B29C 66/43421; B29C 66/43441; Y10T 428/24149; Y10T 428/24165
See application file for complete search history.

(56) References Cited

U.S. PATENT DOCUMENTS 4,657,615 A * 4/1987 Braun ................... B29C 70/342
156/245
4,793,727 A    12/1988 Schmaling
(Continued)

FOREIGN PATENT DOCUMENTS

EP    0798107 A2    10/1997
WO   WO9508437 A1    3/1995

OTHER PUBLICATIONS

European Patent Office Extended Search Report, dated Oct. 19, 2018, regarding Application No. 18165798.2, 9 pages.

*Primary Examiner* — Carson Gross
(74) *Attorney, Agent, or Firm* — Yee & Associates, P.C.

(57) ABSTRACT

A method and apparatus for fabricating a composite structure. The method comprises defining a shape for the composite structure with a first face sheet. The method places core sections on the shape defined by the first face sheet. The method places an adhesive in a group of joint cavities. The method places a second face sheet on the core sections placed on the first face sheet, wherein the first face sheet, the core sections, and the second face sheet, define a structural assembly in which the group of joint cavities are present. The method cures the structural assembly with the adhesive in the group of joint cavities to fabricate the composite structure in which the adhesive fills the group of joint cavities when the adhesive is cured.

34 Claims, 15 Drawing Sheets

(51) Int. Cl.
*B32B 7/12* (2006.01)
*B32B 5/18* (2006.01)
*B29C 65/00* (2006.01)
*B29D 99/00* (2010.01)
*B29C 65/48* (2006.01)
*B29C 65/50* (2006.01)
*B29C 69/00* (2006.01)
*B29D 24/00* (2006.01)
*B29L 31/30* (2006.01)

(52) U.S. Cl.
CPC ............... *B32B 7/12* (2013.01); *B32B 37/12* (2013.01); *B29C 66/727* (2013.01); *B29C 66/7212* (2013.01); *B29C 66/73921* (2013.01); *B29C 66/73941* (2013.01); *B29L 2031/3076* (2013.01); *B32B 2266/06* (2013.01); *B32B 2266/08* (2013.01); *B32B 2305/022* (2013.01); *B32B 2305/024* (2013.01); *B32B 2305/72* (2013.01); *B32B 2605/18* (2013.01); *Y10T 428/24149* (2015.01); *Y10T 428/24165* (2015.01)

(56) References Cited

U.S. PATENT DOCUMENTS

| | | | | |
|---|---|---|---|---|
| 4,824,631 A | * | 4/1989 | Yeager | ............... B29C 33/405 156/264 |
| 5,455,096 A | * | 10/1995 | Toni | ............... B29C 44/12 428/116 |
| 6,782,672 B2 | | 8/2004 | Staats | |
| 2015/0273788 A1 | | 10/2015 | Sugihara | |

\* cited by examiner

COMPOSITE PANEL SANDWICH STRUCTURES WITH INTEGRATED JOINTS

BACKGROUND INFORMATION

1. Field

The present disclosure relates generally to composite structures, and in particular, to composite structures with joints. Still more particularly, the present disclosure relates to sandwich panel structures with integrated joints and a method for fabricating sandwich panel structures with integrated joints.

2. Background

Aircraft are being designed and manufactured with greater and greater percentages of composite materials. Composite materials are used in aircraft to decrease the weight of the aircraft. This decreased weight improves performance features such as payload capacity and fuel efficiency. Further, composite materials provide a longer service life for various components in an aircraft.

Composite materials may be tough, light-weight materials created by combining two or more functional components. For example, a composite material may include reinforcing fibers bound in a polymer resin matrix. The fibers may be unidirectional or may take the form of a woven cloth or fabric. The fibers and resins may be arranged and cured to form a composite structure.

Composite panel sandwich structures are one form of composite structures used in aircraft. These composite panel sandwich structures take the form of panels or other parts that may be joined together to form various structures within the interior or exterior of an aircraft. For example, monuments in an aircraft cabin, such as an overhead storage bin, a closet, a lavatory, a cabinet, a galley, and other types of structures, may be formed from joining composite sandwich parts together.

Currently, most of these composite sandwich parts are joined to each other using bonded joints that start with flat prefabricated panels and cut out smaller panel sections for joining. These bonded joints include, for example, tab joints and slot joints, potted inserts, and bracketed joints. These joints often involve two-part epoxy based adhesives. These types of adhesives, however, may lead to various issues. Extensive labor is involved in cutting the panels and preparing the joints. Further, these types of bonded joints also may have a less than desired structural capacity. Also, the curing time may often be slower than desired. For example, curing time, from about four hours to eight hours, is typically present for these types of joints. These types of joints may require clean up and create a larger amount of waste than desired. Moreover, curing shrinkage also may lead to aesthetic issues that are labor-intensive to resolve. For example, when starting with flat panels, the completed structures are limited to rectilinear configurations and more complex contours are often not possible.

Therefore, it would be desirable to have a method and apparatus that take into account at least some of the issues discussed above, as well as other possible issues. For example, it would be desirable to have a method and apparatus that overcome a technical problem with currently used joints for joining composite parts to form composite structures.

SUMMARY

An embodiment of the present disclosure provides a method for fabricating a composite structure. The method comprises defining a shape for the composite structure with a first face sheet. The method places core sections on the shape, defined by the first face sheet. The method places an adhesive in a group of joint cavities. The method places a second face sheet on the core sections placed on the first face sheet, wherein the first face sheet, the core sections, and the second face sheet, define a structural assembly in which the group of joint cavities are present. The method cures the structural assembly with the adhesive in the group of joint cavities to fabricate the composite structure in which the adhesive fills the group of joint cavities when the adhesive is cured.

Another embodiment of the present disclosure provides a method for fabricating a composite structure. The method comprises placing an adhesive in a group of joint cavities in a structural assembly comprising a first face sheet assembly, core sections, and a second face sheet assembly. The method cures the structural assembly to fabricate the composite structure.

Yet another embodiment of the present disclosure provides a composite panel sandwich structure. The composite panel sandwich structure comprises a first face sheet having a three-dimensional shape for the composite panel sandwich structure and a second face sheet having the three-dimensional shape. The composite panel sandwich structure has core sections located between the first face sheet and the second face sheet in which the first face sheet, the second face sheet, and the core sections define a group of joint cavities. The composite panel sandwich structure has an adhesive located in the group of joint cavities in which the adhesive expands to fill each of the group of joint cavities when the adhesive is cured.

A further embodiment of the present disclosure provides a method for fabricating a composite panel sandwich structure. The method comprises defining a three-dimensional shape for the composite structure with a first face sheet in which the first face sheet is comprised of a first group of plies. The method places core sections on the three-dimensional shape defined by the first face sheet in which the core sections are from at least one of a honeycomb core, a closed cell foam core, and an open cell foam core. The method places an adhesive in a group of joint cavities, in which the adhesive is selected from at least one of an nonflowing adhesive that does not flow during curing, a foaming adhesive, or an expanding adhesive. The method places a second face sheet on the core sections placed on the first face sheet, in which the second face sheet is comprised of a second group of plies and the first face sheet, the core sections, and the second face sheet, define a structural assembly in which the group of joint cavities are present and in which a ply in the first group of plies and the second group of plies is comprised of at least one of a carbon fiber reinforced polymer, a carbon fiber reinforced thermoplastic polymer, a carbon fiber reinforced thermoset polymer, and a glass fiber reinforced polymer, a glass fiber reinforced thermoplastic polymer, or a glass fiber reinforced thermoset polymer. The method cures the structural assembly with the adhesive in the group of joint cavities to fabricate the composite structure in which the adhesive expands to fill each of the group of joint cavities when the adhesive is cured.

Yet another embodiment of the present disclosure provides a method for fabricating a composite panel sandwich structure. The method comprises positioning a first panel, a second panel, a first uncured portion in the first face sheet assembly and a second uncured portion in a second face sheet assembly to form a structural assembly in which the first panel and the second panel are in a cured form and contain core sections. The first face sheet is comprised of a first group of plies and the second face sheet is comprised of a second group of plies and in which a ply in the first group of plies and the second group of plies is comprised of at least one of a carbon fiber reinforced polymer, a carbon fiber reinforced thermoplastic polymer, a carbon fiber reinforced thermoset polymer, a glass fiber reinforced thermoplastic polymer, or a glass fiber reinforced thermoset polymer, and in which the core sections are selected from at least one of a honeycomb core, a closed cell foam core, or an open cell foam core. The method places an adhesive in a group of joint cavities in the structural assembly in which the adhesive is selected from at least one of a nonflowing adhesive that does not flow during curing, a foaming adhesive, or an expanding adhesive. The method cures the structural assembly to fabricate the composite structure in which the adhesive expands to fill each of the group of joint cavities when the adhesive is cured.

Still another embodiment of the present disclosure provides a composite panel sandwich structure. The composite panel sandwich structure comprises a first face sheet having a three-dimension shape for the composite panel sandwich structure in which the first face sheet is comprised of a first group of plies and a second face sheet having the three-dimensional shape in which the second face sheet is comprised of a second group of plies. A ply in the first group of plies and the second group of plies is comprised of at least one of a carbon fiber reinforced polymer, a carbon fiber reinforced thermoplastic polymer, a carbon fiber reinforced thermoset polymer, a glass fiber reinforced thermoplastic polymer, or a glass fiber reinforced thermoset polymer. The composite panel sandwich structure has core sections located between the first face sheet and the second face sheet in which the first face sheet, the second face sheet, and the core sections define a group of joint cavities in which the core sections are selected from at least one of a honeycomb core, a closed cell foam core, or an open cell foam core. The composite panel sandwich structure includes an adhesive located in the group of joint cavities in which the adhesive is selected from at least one of a nonflowing adhesive that does not flow during curing, a foaming adhesive, or an expanding adhesive in which the adhesive expands to fill each of the group of joint cavities when the adhesive is cure.

Yet another embodiment of the present disclosure provides a method for fabricating a composite structure. The method comprises forming a first face sheet with contours to define a three-dimensional shape. The method comprises placing core sections on the first face sheet, and placing a second face sheet on the core sections placed on the first face sheet. The second face sheet has a shape that corresponds to the three-dimensional shape for the first face sheet and in which the first face sheet, the core sections, and the second face sheet define a structural assembly in which a group of joint cavities are present. The method comprises placing an adhesive in the group of joint cavities, and curing the structural assembly with the adhesive in the group of joint cavities to fabricate the composite structure in which the adhesive expands to fill each of the group of joint cavities when the adhesive is cured.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take account that currently used techniques for creating joints for composite structures may be more complex than desired. Further, those embodiments also recognize and take account that currently used techniques may not provide a desired level of structural performance.

Thus, the illustrative embodiments provide a method and apparatus for fabricating a composite structure. In one illustrative example, a three-dimensional shape is defined with a first face sheet. Core sections are placed on the three-dimensional shape for the composite structure defined by the first face sheet. An adhesive is placed into the joint cavities. A second face is placed on the core sections placed on the first face sheet. The core sections, the second face sheet, and the adhesive form a structural assembly in which a group of joint cavities are present. The structural assembly may be cured with the adhesive in the joint cavities to fabricate the composite structure. The curing of the adhesive may form integrated joints for the composite structure in which the adhesive expands to fill each of the group of joint cavities when the adhesive is cured. In the illustrative examples, the face sheets and core can be shaped into complex contours with integrated joints.

Figure 1:
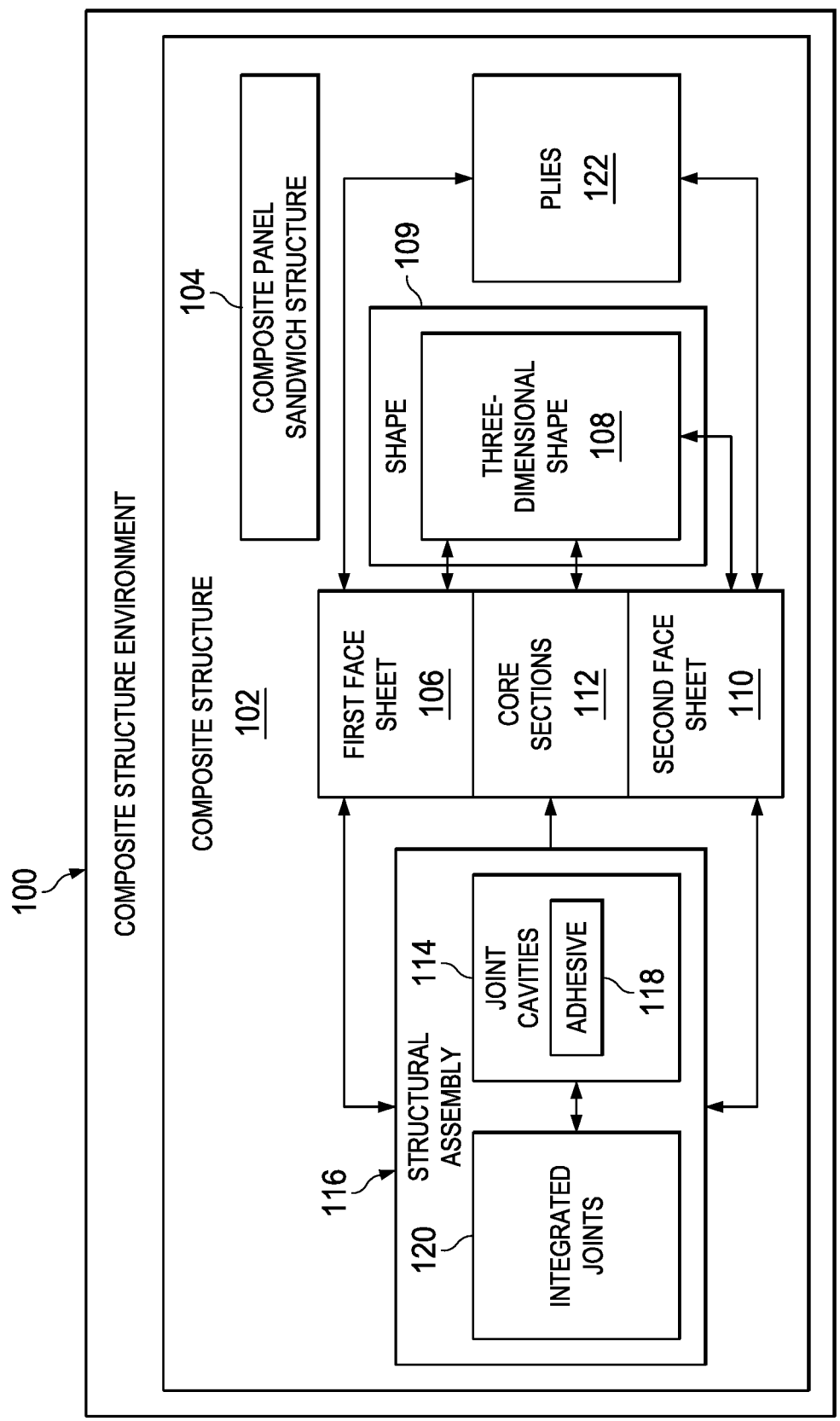
FIG. 1 is a composite structure environment in accordance with an illustrative embodiment.

With reference now to the figures, and in particular, with reference to FIG. 1, a composite structure environment is depicted in accordance with an illustrative embodiment. In this illustrative example, composite structure environment 100 is an environment in which composite structure 102 may be fabricated.

Composite structure 102 may take different forms. For example, composite structure 102 may be selected from a group comprising an aircraft structure, a control surface, a monument for an aircraft cabin, an overhead stowage bin, a closet, a lavatory, a galley, a cabinet, or some other suitable type of composite structure.

As depicted, composite structure 102 may be composite panel sandwich structure 104 that includes first face sheet 106 having shape 109 in the form of three-dimensional shape 108. Second face sheet 110 has three-dimensional shape 108 that corresponds to three-dimensional shape 108 for first face sheet 106 and core sections 112.

As depicted, three-dimensional shape 108 is a shape that has contours. The contours may be complex contours such that shape 109 is not planar. The contours may be curves, angles, or some other deviation from a planar surface.

In this example, core sections 112 are located between first face sheet 106 and second face sheet 110. Core sections 112 are selected from at least one of a honeycomb core, a closed cell foam core, or an open cell foam core. As depicted, core sections 112 may be positioned or arranged with a complex contour for three-dimensional shape 108 for first face sheet 106.

As depicted, first face sheet 106 may be comprised of a first group of plies 122. Second face sheet 110 may be comprised of a second group of plies 122. As used herein, a "group of" when used with reference to items means one or more items. For example, a group of plies 122 is one or more of plies 122. A ply in the first group of plies 122 and the second group of plies 122 may be comprised at least one of a carbon fiber reinforced polymer, a carbon fiber reinforced thermoplastic polymer, a carbon fiber reinforced thermoset polymer, a glass fiber reinforced thermoplastic polymer, or a glass fiber reinforced thermoset polymer.

As depicted, first face sheet 106, second face sheet 110, and core sections 112 may define structural assembly 116 in which a group of joint cavities 114 is located. In this illustrative example, adhesive 118 may be located in the group of joint cavities 114.

When cured, structural assembly 116 with adhesive 118 in the group of joint cavities 114 forms composite structure 102. In this illustrative example, adhesive 118 in group of joint cavities 114 may form a group of integrated joints 120.

Adhesive 118 may be selected from at least one of a non-flowing adhesive that does not flow during curing, a foaming adhesive, or an expanding adhesive. Adhesive 118 may be selected to expand in volume in a manner that fills joint cavities 114 in a manner that reduces or eliminates gaps or voids in joint cavities 114.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

Figure 2:
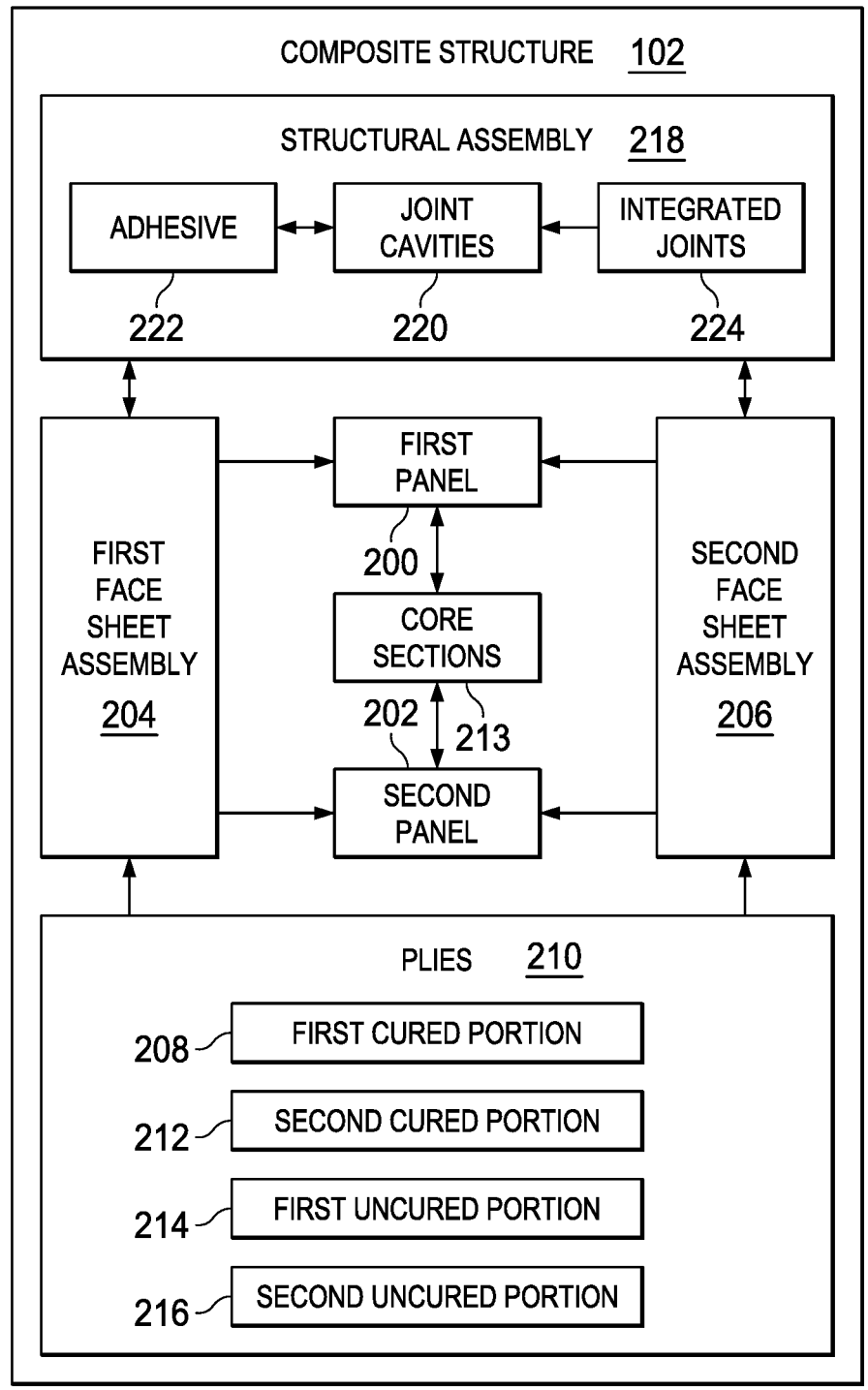
FIG. 2 is an illustration of a composite structure in accordance with an illustrative embodiment.

With reference now to FIG. 2, an illustration of a composite structure is depicted in accordance with an illustrative embodiment. In this illustrative example, composite structure 102 is comprised of first panel 200 and second panel 202. A part of first face sheet assembly 204 forms first panel 200, and a part of second face sheet assembly 206 forms second panel 202.

As depicted, first face sheet assembly 204 may be comprised of first cured portion 208 of plies 210. Further, second face sheet assembly 206 may be comprised of second cured portion 212 of plies 210. As depicted, first panel 200 and second panel 202 include core sections 213.

Composite structure 102 also may include first uncured portion 214 in first face sheet assembly 204 and second uncured portion 216 in second face sheet assembly 206 to form structural assembly 218 for composite structure 102 in which first panel 200 and second panel 202 are in a cured form. In other words, some of plies 210 may be cured, while others of plies 210 may be uncured. For example, plies 210 that are part of first panel 200 and second panel 202 are cured, while other plies in plies 210 that are utilized to join these panels to each other are uncured.

As depicted, structural assembly 218 includes joint cavities 220 in which an adhesive may be placed. Structural assembly 218 may be cured such that first uncured portion 214 in plies 210 and second uncured portion 216 in plies 210 are cured and join first panel 200 and second panel 202 to each other. Additionally, the curing process also may cure adhesive 222 to form a group of integrated joints 224 in joint cavities 220.

In one illustrative example, one or more technical solutions are present that overcome a technical problem with currently used joints for joining composite parts to form composite structures. As a result, one or more technical solutions may provide a technical effect of fabricating composite structures in a manner that is at least one of reducing time to fabricate composite structures, reducing labor, increasing structural performance, increased aesthetics, reduced clean up, or other desirable features for composite structures. Further, the illustrative example also provides a technical solution in which a technical effect is present in which cured composite parts may be joined to each other with integrated joints.

Further, the illustrative example provides a technical solution for creating joints having a technical effect of allowing for easier manufacturing of composite structures with complex contours. Another technical effect is reducing a need for utilizing flat prefabricated sandwich panels.

The illustration of composite structure environment 100 and the different components in FIGS. 1 and 2 are not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, composite structure 102 as described and shown in FIG. 2 may be applied to form integrated joints 224 with cured face sheets, uncured "green" face sheets, or both cured face sheets and uncured "green" face sheets. For example, first panel 200 and second panel 202 may be flat prefabbed sandwich panels. First panel 200 and second panel 202 may be positioned such that the face sheets in first face sheet assembly 204, second face sheet assembly 206, and core sections 213 form a group of joint cavities 220 that may be filled with an expandable adhesive. In this example, the group of joint cavities 220 may be located a group of joints selected from at least one of a "T" joint or an "L" joint in first panel 200 and second panel 202.

Figure 3:
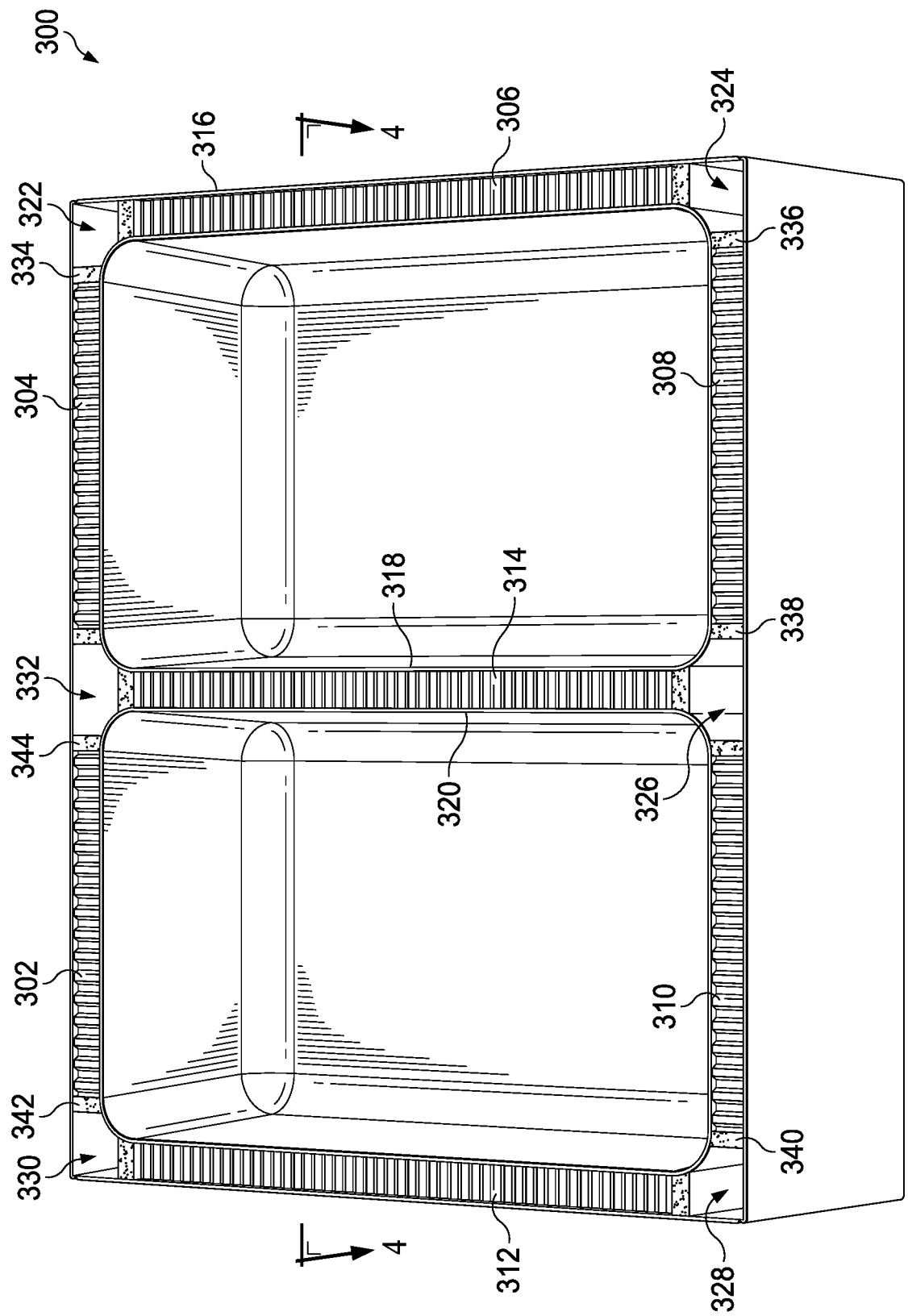
FIG. 3 is an illustration of a structural assembly of uncured composite parts for a composite structure in accordance with an illustrative embodiment.

With reference now to FIG. 3, an illustration of a structural assembly of uncured composite parts for a composite structure is depicted in accordance with an illustrative embodiment. In this illustrative example, structural assembly 300 is comprised of core section 302, core section 304, core section 306, core section 308, core section 310, core section 312, and core section 314. As depicted, these core sections are honeycomb cores. In this illustrative example, these core sections are located between outer face sheet 316 and inner face sheet 318 and inner face sheet 320.

Outer face sheet 316 is an example of an implementation for first face sheet 106 shown in block form in FIG. 1. Inner face sheet 318 and inner face sheet 320 are examples of implementations for second face sheet 110 shown in block form in FIG. 1. Core section 302, core section 304, core section 306, core section 308, core section 310, core section 312, and core section 314 are examples of an implementation for core sections 112 shown in block form in FIG. 1. These face sheets may be plies in which a ply may be comprised of a carbon fiber, a glass fiber, a woven fabric prepreg material, or some other suitable material.

As depicted, joint cavity 322, joint cavity 324, joint cavity 326, joint cavity 328, joint cavity 330, and joint cavity 332 are present in structural assembly 300 and are examples of joint cavities 220 shown in block form in FIG. 2.

In this illustrative example, an adhesive, in the form of an expandable adhesive sheet, is present. As depicted, expandable adhesive sheet 334 is located in joint cavity 322, expandable adhesive sheet 336 is located in joint cavity 324, expandable adhesive sheet 338 is located in joint cavity 326, expandable adhesive sheet 340 is located in joint cavity 328, expandable adhesive sheet 342 is located in joint cavity 330, and expandable adhesive sheet 344 is located in joint cavity 332.

Figure 4:
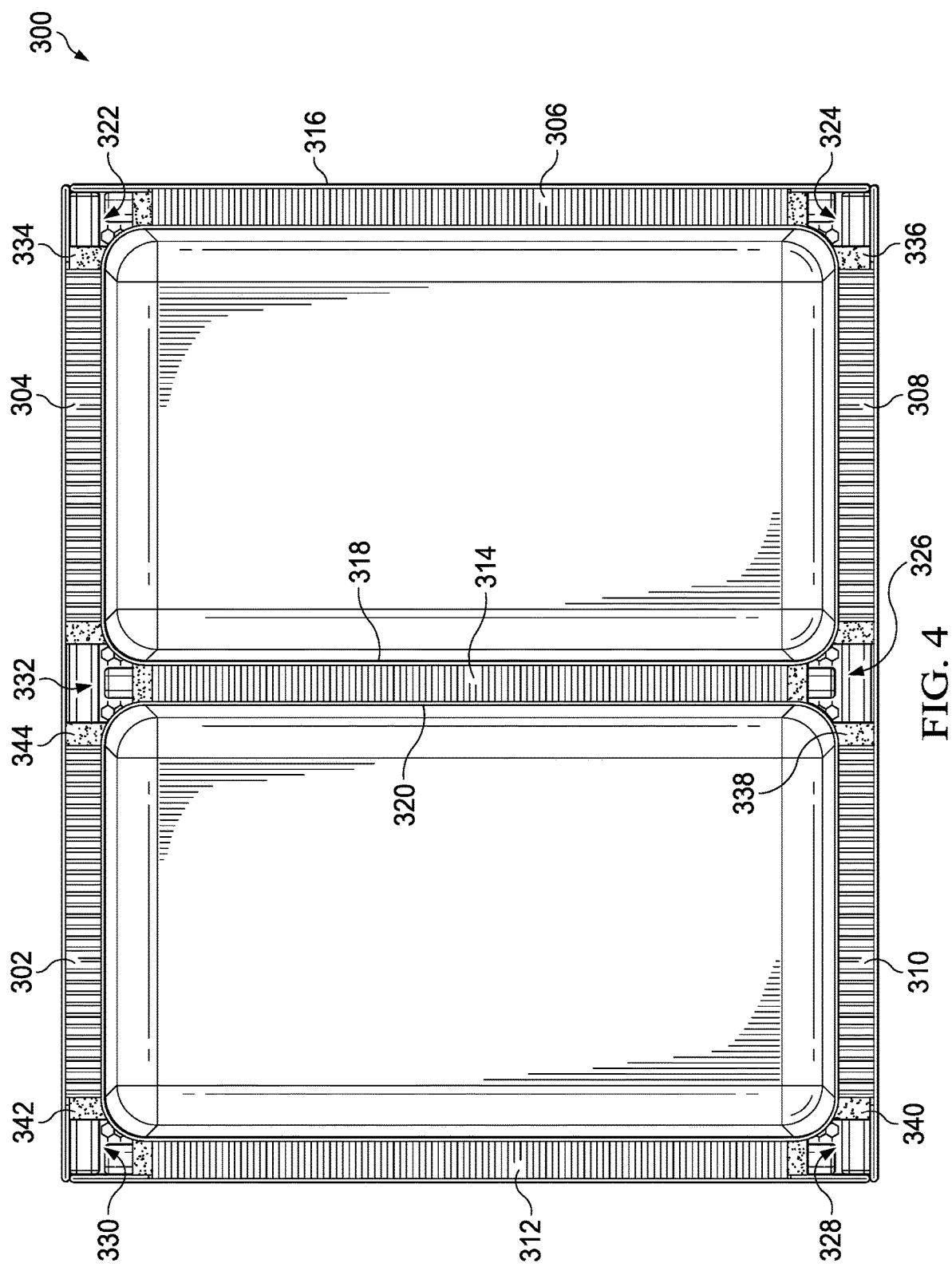
FIG. 4 is an illustration of a top view of an uncured composite structure in accordance with an illustrative embodiment.

With reference now to FIG. 4, an illustration of a top view of an uncured composite structure is depicted in accordance with an illustrative embodiment. In this illustrative example, a top view of structural assembly 300 in FIG. 3 is shown in the direction of lines 4-4.

Figure 5:
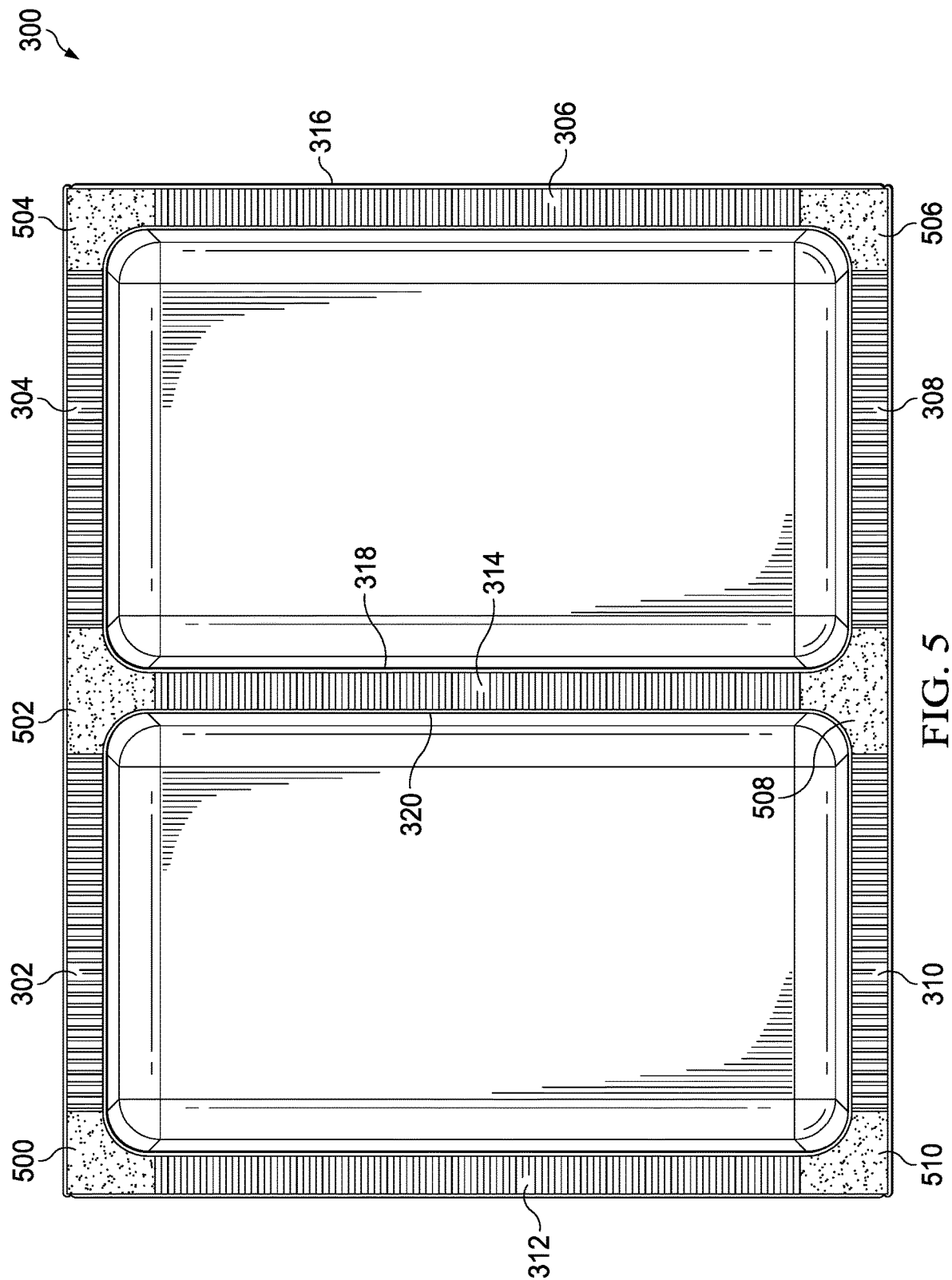
FIG. 5 is an illustration of a top view of a cured composite structure in accordance with an illustrative embodiment.

With reference next to FIG. 5, an illustration of a top view of a cured composite structure is depicted in accordance with an illustrative embodiment. In this illustrative example, a top view of a cured form of structural assembly 300 in FIG. 3 is shown in the direction of lines 4-4.

In this illustrative example, the expandable adhesive sheets have been cured and have expanded to form integrated joint 500, integrated joint 502, integrated joint 504, integrated joint 506, integrated joint 508, and integrated joint 510.

Figure 6:
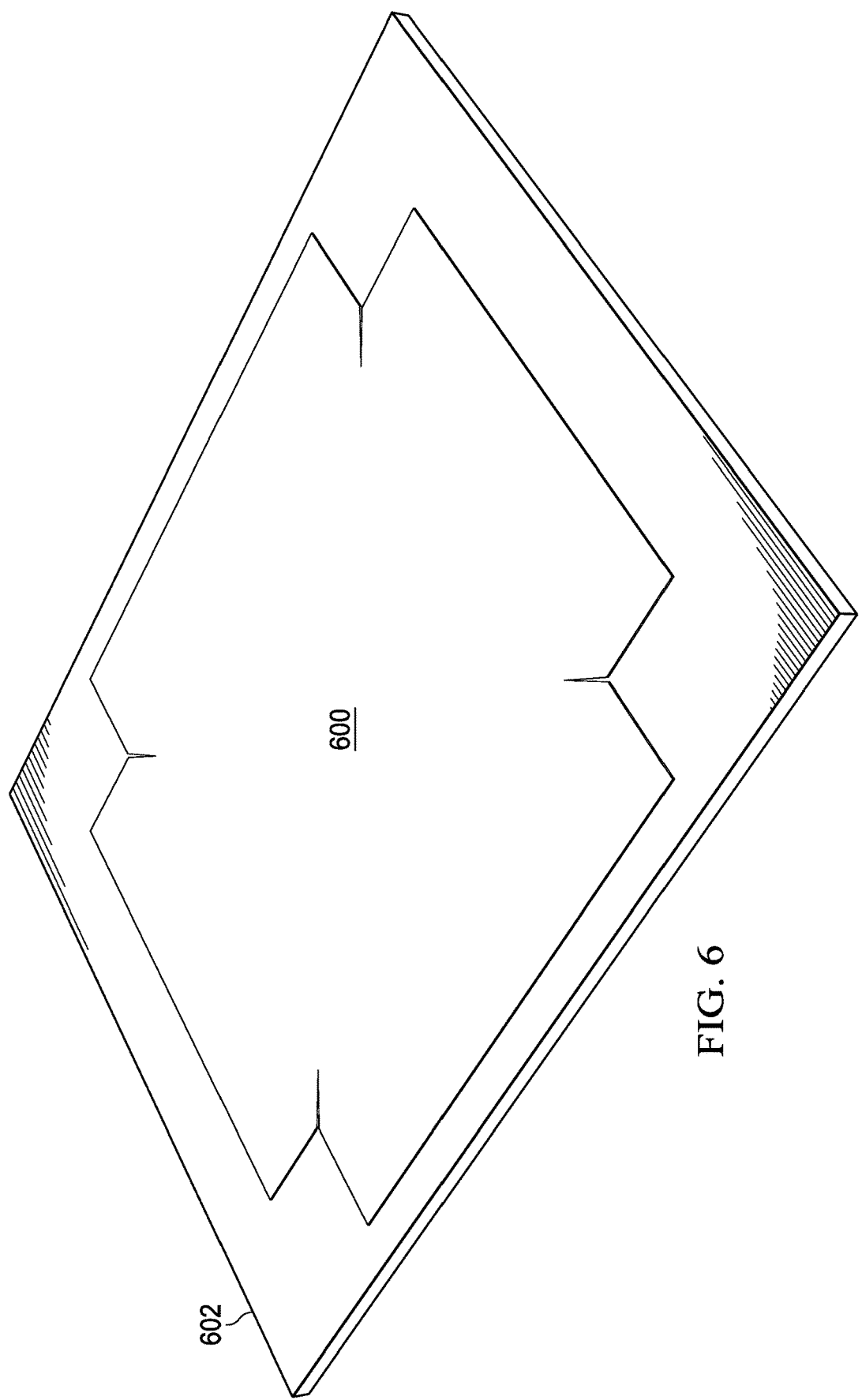
FIG. 6 is an illustration of a face sheet positioned on a caul in accordance with an illustrative embodiment.

With reference to FIGS. 6-13, illustrations of a process for forming a composite structure with integrated joints is depicted in accordance with an illustrative embodiment. With reference to FIG. 6, an illustration of a face sheet positioned on a caul is depicted in accordance with an illustrative embodiment. In this illustrative example, outer face sheet 600 has been placed on base caul 602. In this illustrative example, outer face sheet 600 is a ply formed from fiberglass. In this illustrative example, outer face sheet 600 has been compressed on a vacuum table (not shown).

Figure 7:
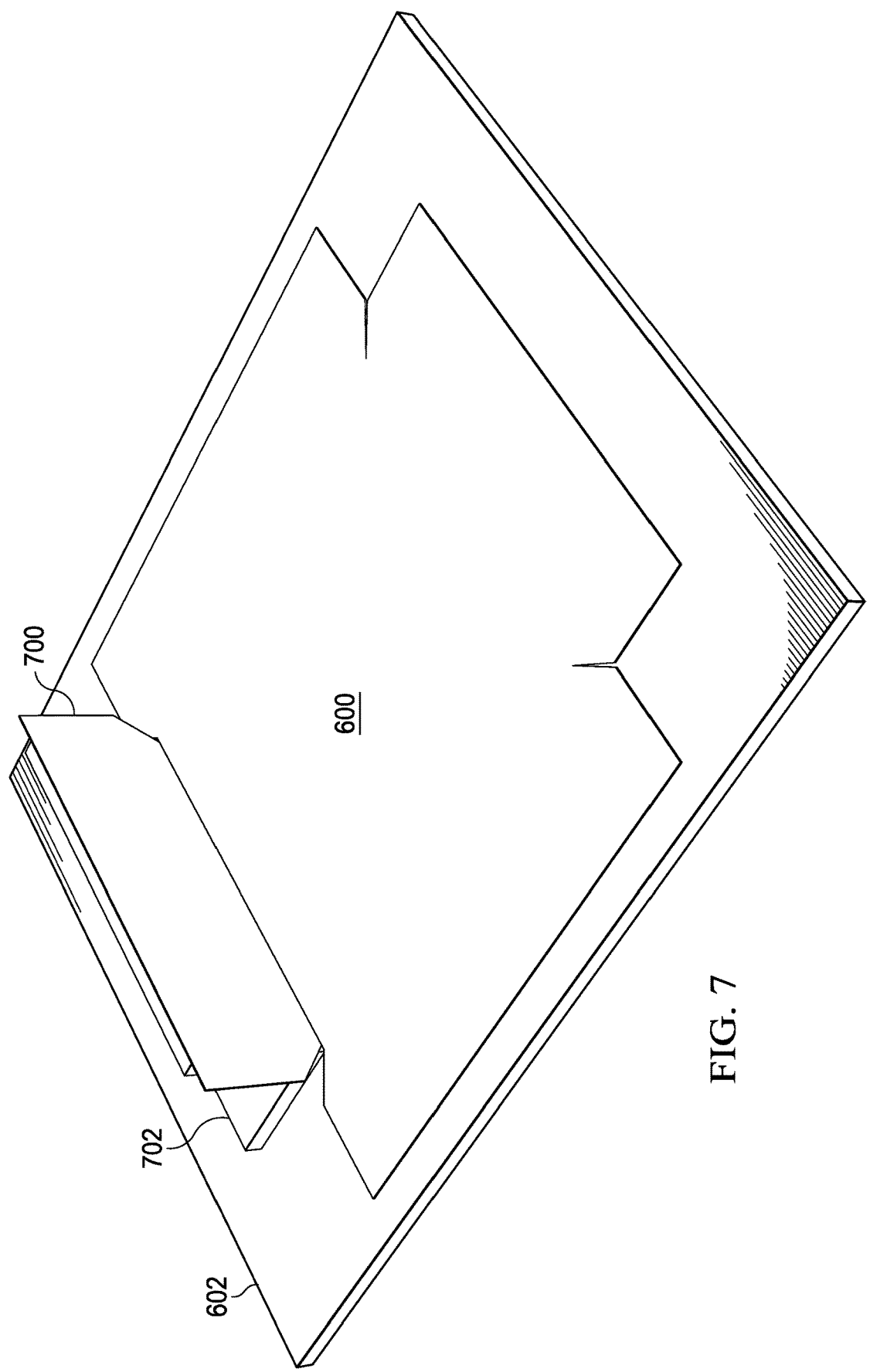
FIG. 7 is an illustration of shaping a face sheet in accordance with an illustrative embodiment.

With reference next to FIG. 7, an illustration of shaping a face sheet is depicted in accordance with an illustrative embodiment. In this illustrative example, flange 700 on outer face sheet 600 has been folded on first caul 702. Additionally, flange 700 has been attached to first caul 702.

Figure 8:
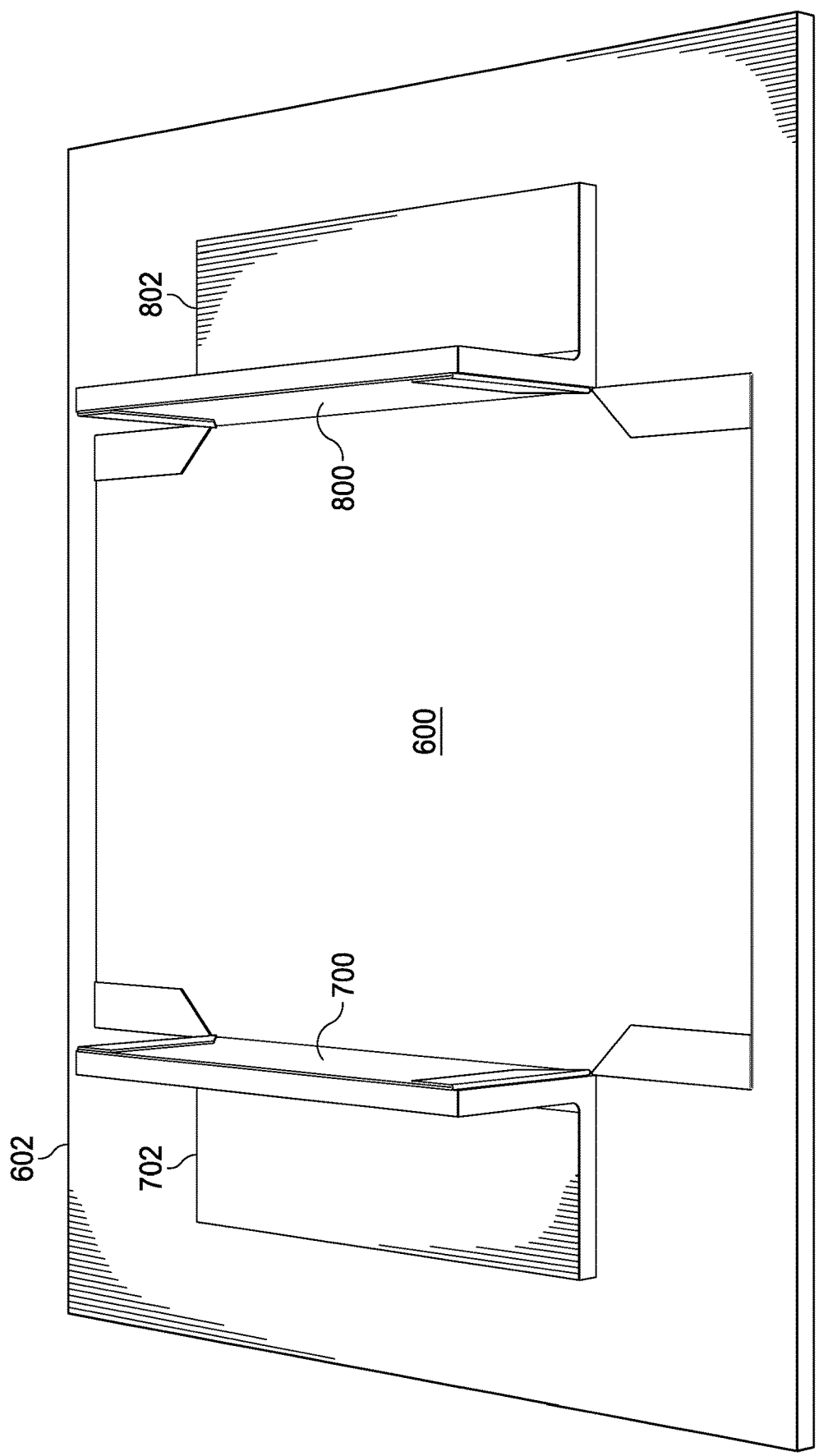
FIG. 8 is another illustration of shaping a face sheet in accordance with an illustrative embodiment.

Turning to FIG. 8, another illustration of shaping a face sheet is depicted in accordance with an illustrative embodiment. In this figure, flange 800 on outer face sheet 600 has been folded and attached to second caul 802.

Figure 9:
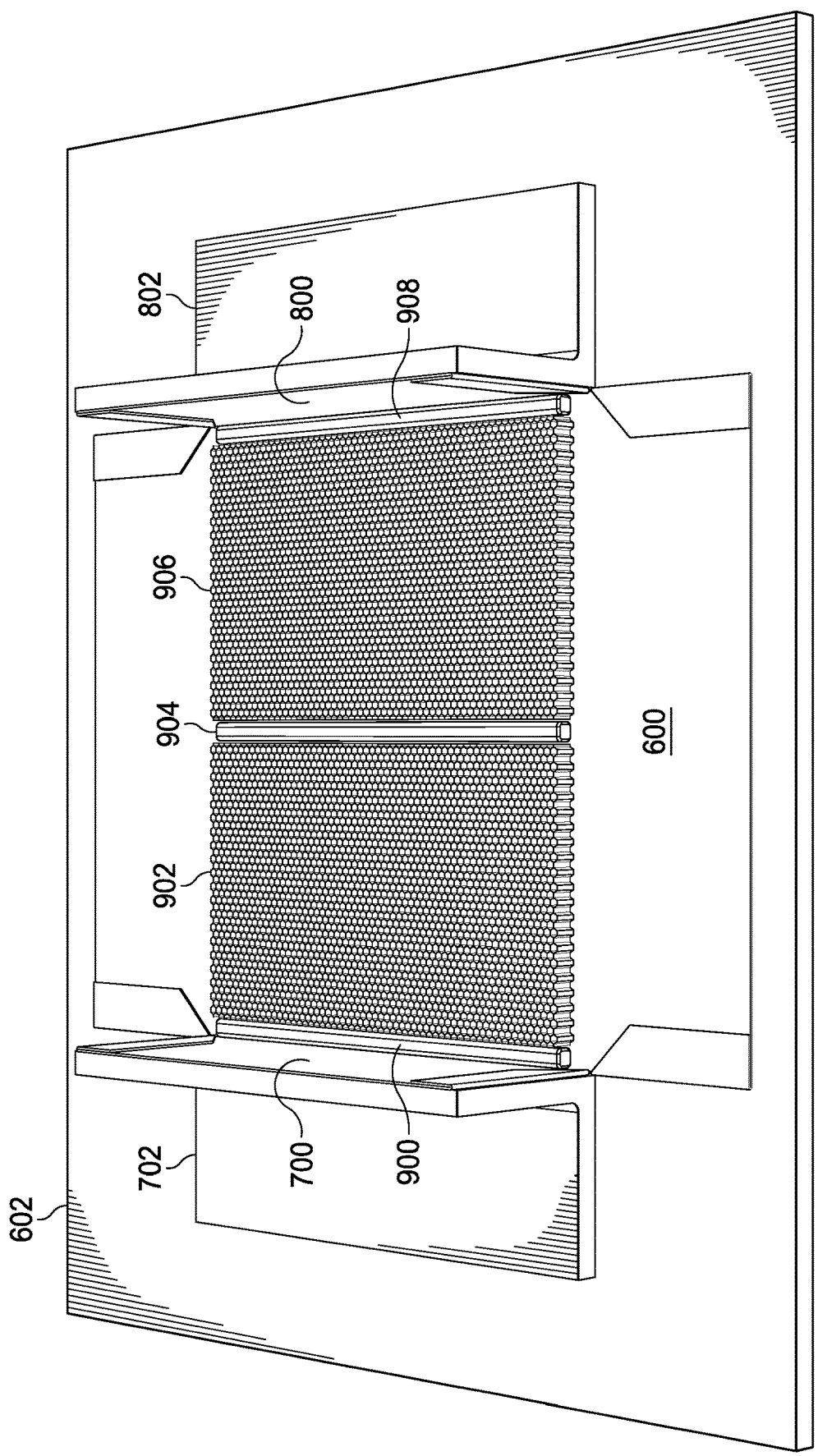
FIG. 9 is an illustration of an adhesive and core sections in accordance with an illustrative embodiment.

In FIG. 9, an illustration of an adhesive and core sections is depicted in accordance with an illustrative embodiment. As depicted, layers of expandable adhesive sheet 900 have been are placed on outer face sheet 600. Core section 902 has been placed onto outer face sheet 600. Thereafter, layers of expandable adhesive sheet 904 have been placed onto outer face sheet 600. Core section 906 is shown as placed onto outer face sheet 600. As depicted, layers of expandable adhesive sheet 908 have been placed onto outer face sheet 600.

Figure 10:
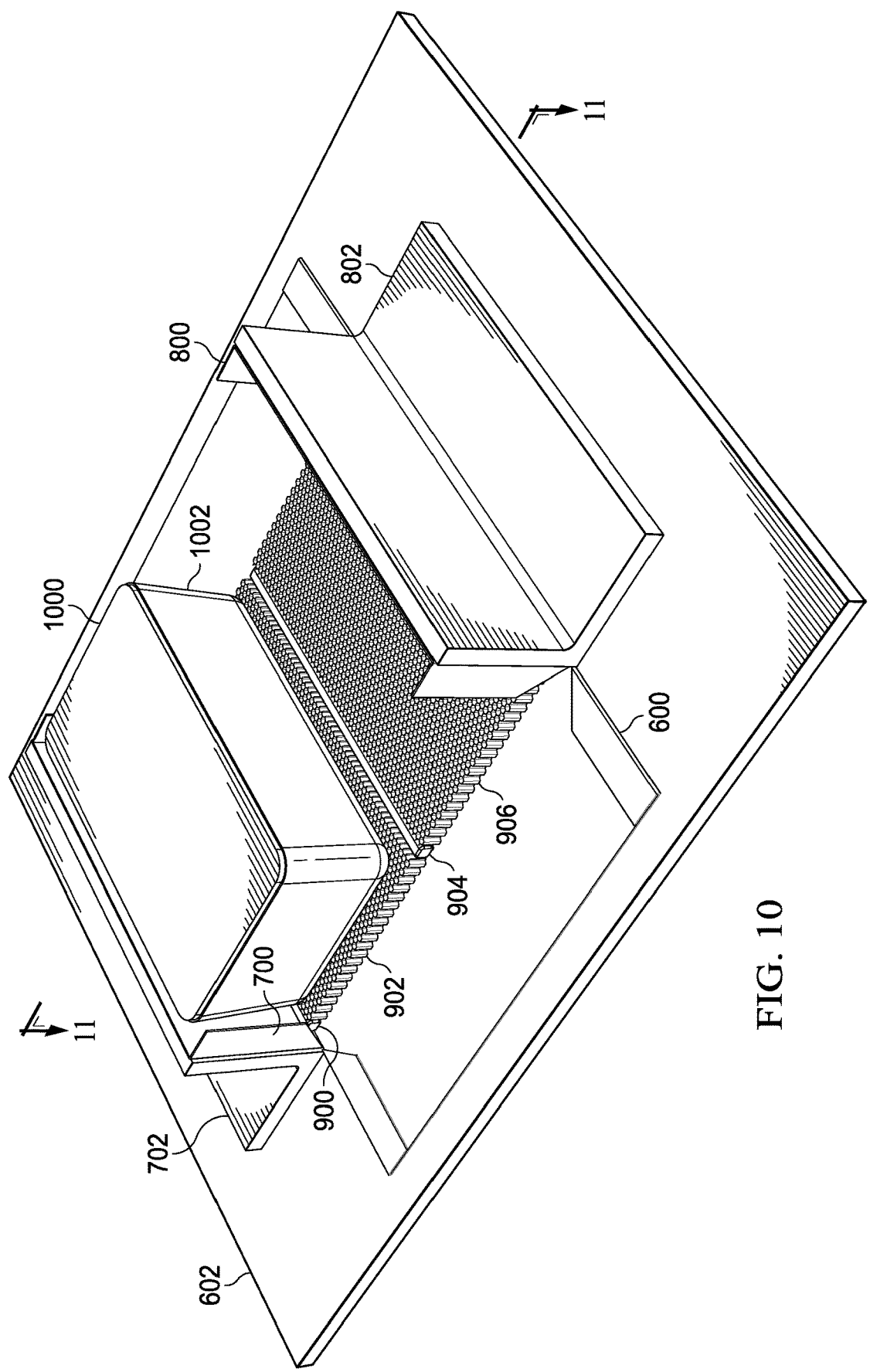
FIG. 10 is an illustration of a top view of a face sheet and core sections positioned relative to a mold in accordance with an illustrative embodiment.

Turning to FIG. 10, an illustration of a top view of a face sheet and core sections positioned relative to a mold is depicted in accordance with an illustrative embodiment. In this figure, mold 1000 with inner face sheet 1002 is shown as placed onto core section 906 adjacent to flange 700.

Figure 11:
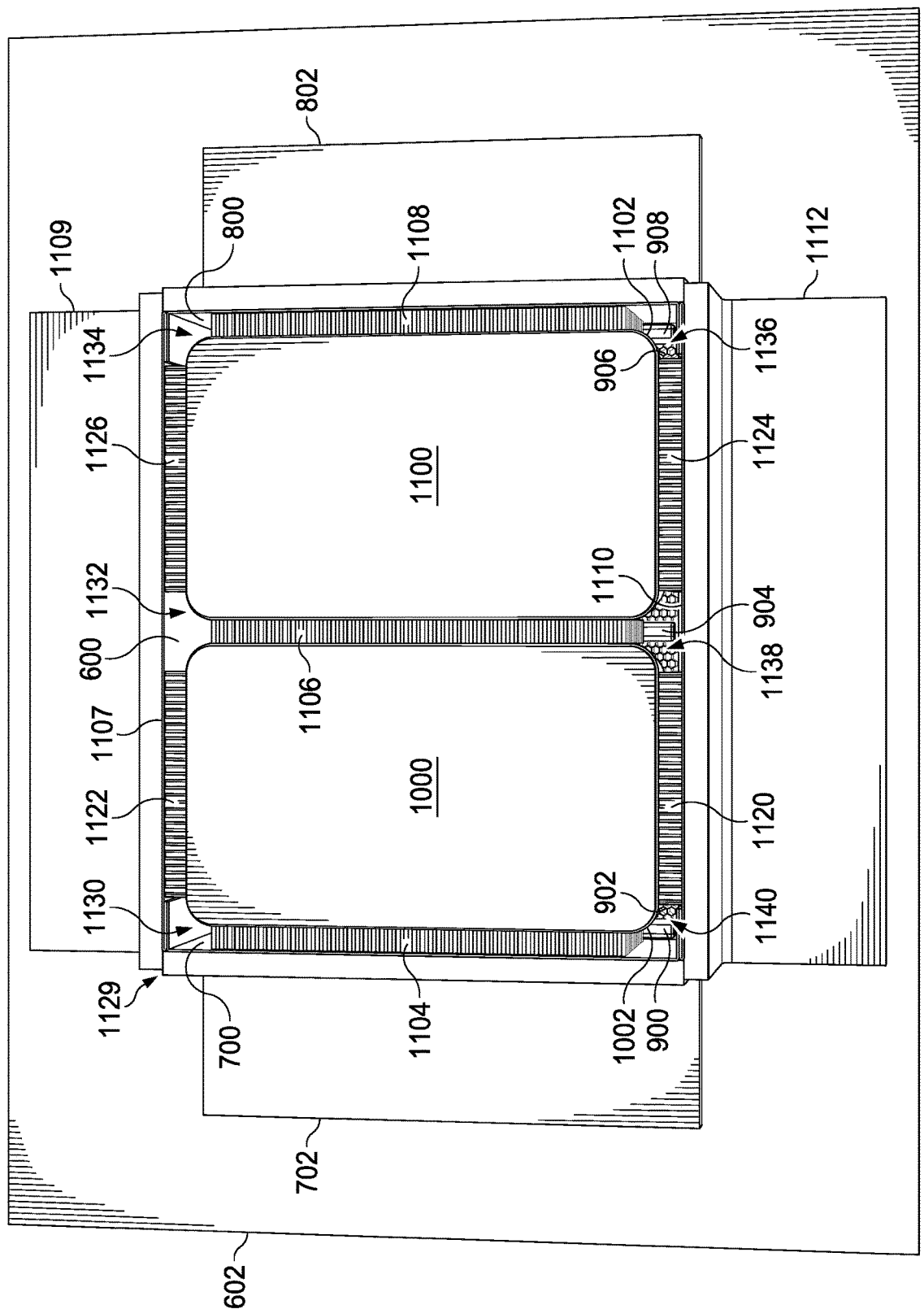
FIG. 11 is an illustration of a top view of face sheets and core sections positioned relative to molds in accordance with an illustrative embodiment.

Next in FIG. 11, an illustration of a top view of face sheets and core sections positioned relative to molds are depicted in accordance with an illustrative embodiment. A top view of mold 1100 in the direction of lines 11-11 in FIG. 10 is shown. In this figure, mold 1100 with inner face sheet 1102 has been placed onto core section 906. Additionally, core section 1104 has been placed onto layers of expandable adhesive sheet 900, core section 1106 has been placed onto layers of expandable adhesive sheet 904, and core section 1108 has been placed onto layers of expandable adhesive sheet 908. Additionally, flange 1107 has been folded and attached to caul 1109, and flange 1110 has been folded and attached to caul 1112.

As depicted, core section 1120 and core section 1122 are shown placed adjacent to mold 1000. Core section 1124 and core section 1126 are depicted as placed adjacent to mold 1100.

In this illustrative example, the placement of the core sections and face sheets around mold 1000 and mold 1100 define structural assembly 1129, which includes joint cavity 1130, joint cavity 1132, joint cavity 1134, joint cavity 1136, joint cavity 1138, and joint cavity 1140 shown in this view.

Figure 12:
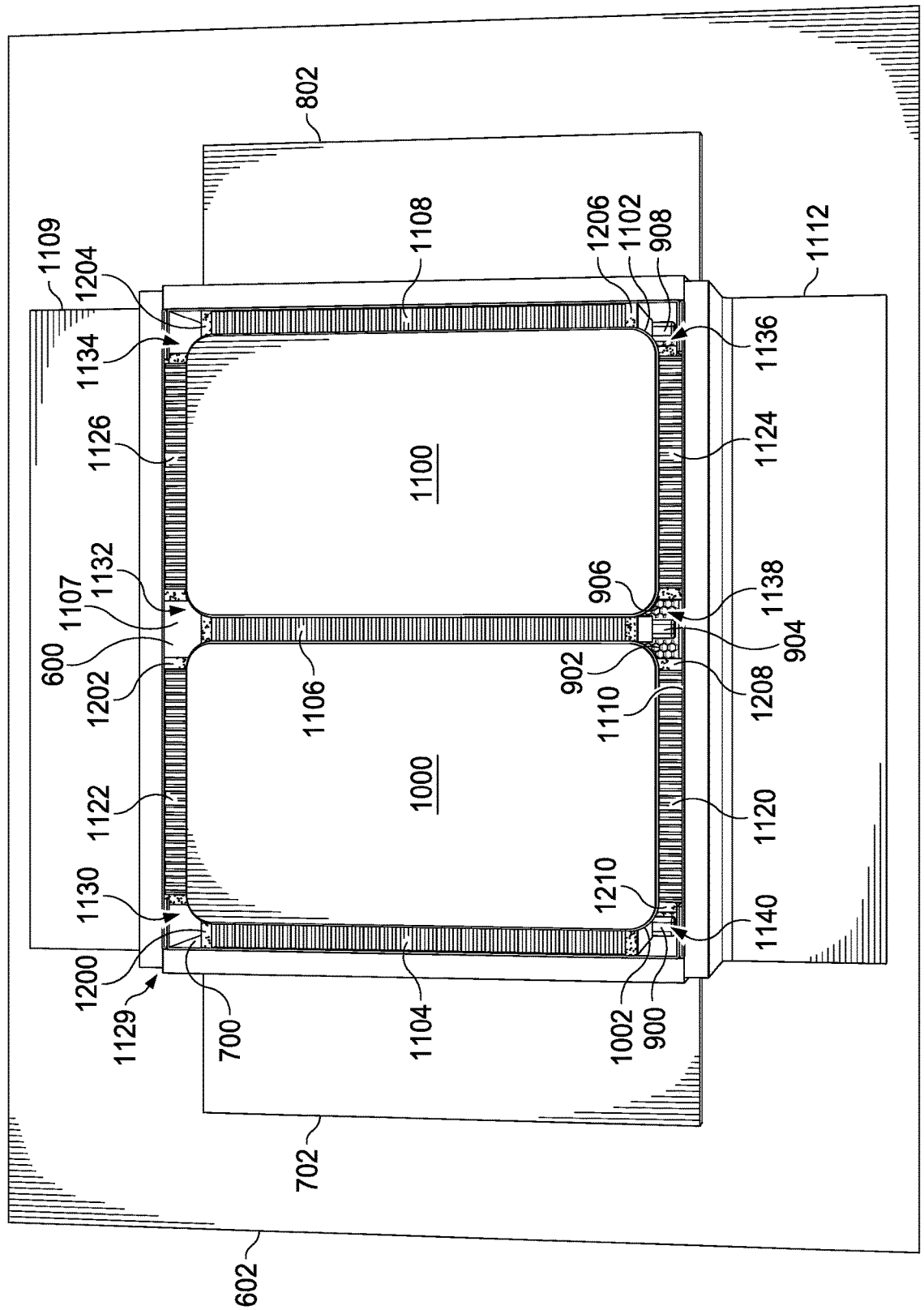
FIG. 12 is an illustration of a structural assembly with an adhesive in joint cavities in accordance with an illustrative embodiment.

With reference now to FIG. 12, an illustration of a structural assembly with an adhesive in joint cavities is depicted in accordance with an illustrative embodiment. In this illustrative example, layers of expandable adhesive sheet 1200 have been placed into joint cavity 1130, and layers of expandable adhesive sheet 1202 have been placed into joint cavity 1132. Layers of expandable adhesive sheet 1204 have been placed into joint cavity 1134, layers of expandable adhesive sheet 1206 have been placed into joint cavity 1136, layers of expandable adhesive sheet 1208 have been placed into joint cavity 1138, and layers of expandable adhesive sheet 1210 have been placed into joint cavity 1140.

Figure 13:
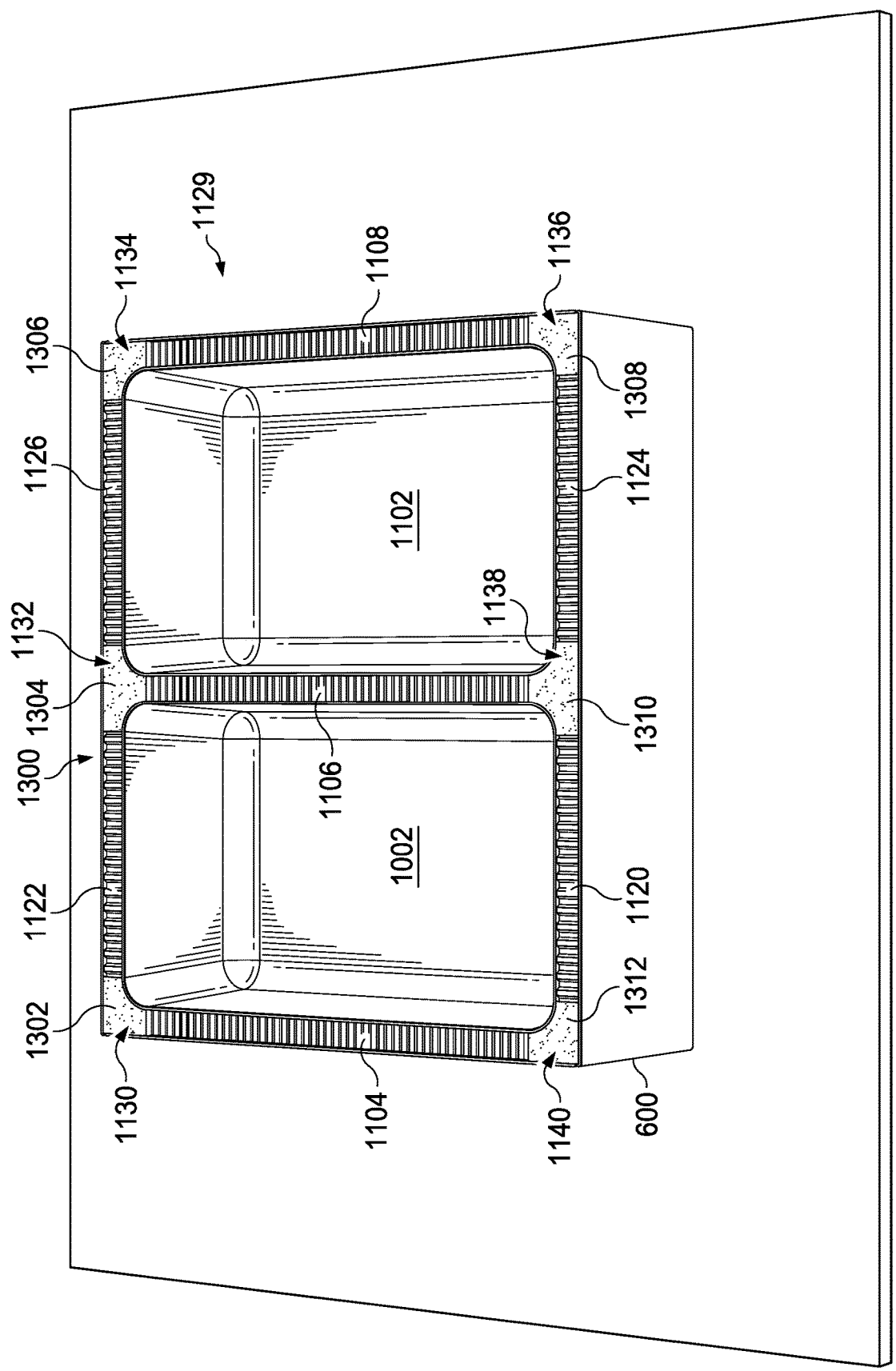
FIG. 13 is an illustration of a composite structure in accordance with an illustrative embodiment.

With reference next to FIG. 13, an illustration of a composite structure is depicted in accordance with an illustrative embodiment. As depicted, structural assembly 1129 with the adhesive as shown in FIG. 12, has been cured to form composite structure 1300. As depicted, composite structure 1300 has integrated joint 1302, integrated joint 1304, integrated joint 1306, integrated joint 1308, integrated joint 1310, and integrated joint 1312.

Figure 14:
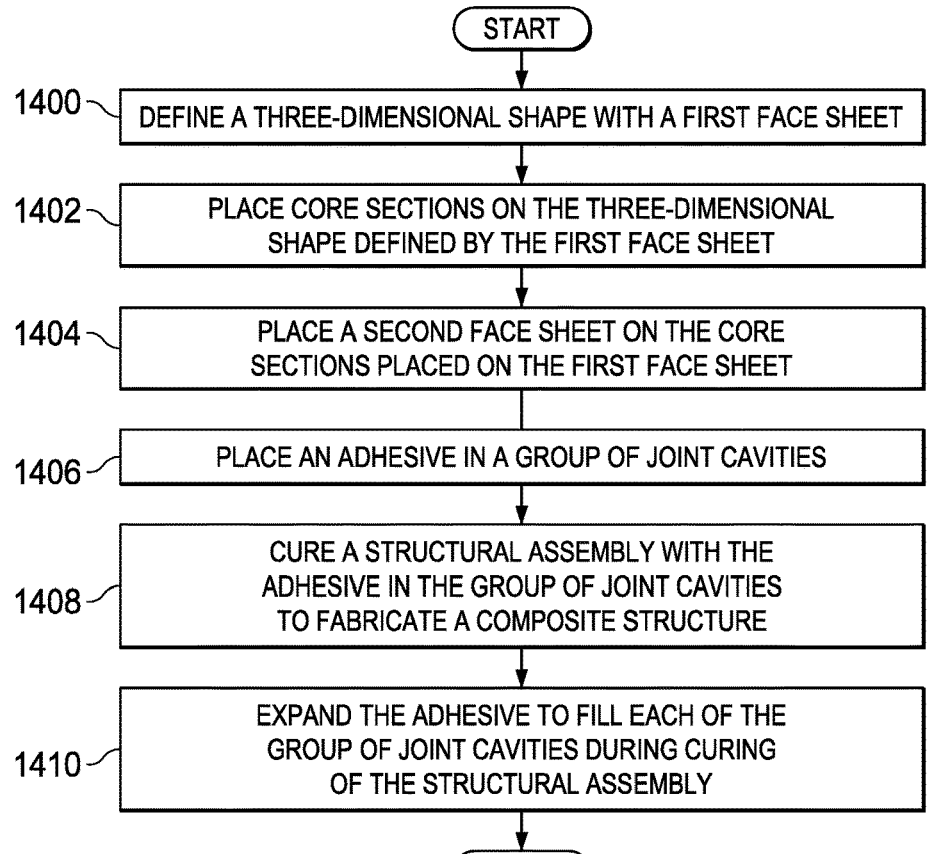
FIG. 14 is an illustration of a flowchart of a process for fabricating a composite structure in accordance with an illustrative embodiment.

Turning next to FIG. 14, a flowchart of a process for fabricating a composite structure is depicted in accordance with an illustrative embodiment. The process in FIG. 14 may be implemented in composite structure environment 100 to fabricate composite structure 102 in FIG. 1.

The process may begin by defining three-dimensional shape 108 with first face sheet 106 (operation 1400). In operation 1400, the first face sheet may be created as a three-dimensional shape with contours. These contours may be complex having multiple curves, angles, or other changes from a planar surface.

The process places core sections 112 on three-dimensional shape 108 defined by first face sheet 106 (operation 1402). The process places second face sheet 110 on core sections 112 placed on first face sheet 106 (operation 1404). As depicted, first face sheet 106, core sections 112, and second face sheet 110 define structural assembly 116, in which the group of joint cavities 114 are present. The process places adhesive 118 in a group of joint cavities 114 (operation 1406).

The process cures structural assembly 116 with adhesive 118 in the group of joint cavities 114 to fabricate composite structure 102 (operation 1408). Adhesive 118 expands to fill each of the group of joint cavities 114 during curing of structural assembly 116 (operation 1410). The process terminates thereafter.

The joints formed in this illustrative process are integrated joints 120. In this illustrative example, adhesive 118 expands within spaces in the group of joint cavities 114 defined by first face sheet 106, core sections 112, and second face sheet 110 to fill joint cavities 114 with adhesive 118 in a manner that reduces or eliminates gaps or voids in these cavities.

Figure 15:
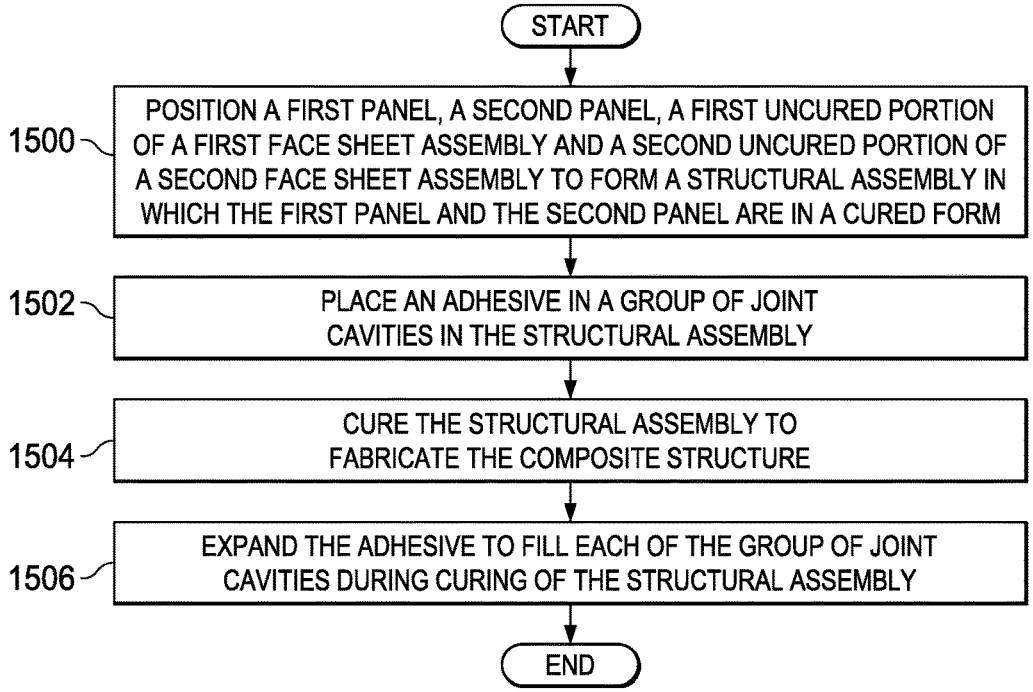
FIG. 15 is an illustration of a flowchart of a process for fabricating a composite structure in accordance with an illustrative embodiment.

Turning next to FIG. 15, a flowchart of a process for fabricating composite structure 102 is depicted in accordance with an illustrative embodiment. The process in FIG. 15 may be implemented in composite structure environment 100 to fabricate composite structure 102 in FIG. 1.

The process may begin by positioning first panel 200, second panel 202, first uncured portion 214 of first face sheet assembly 204 and second uncured portion 216 of second face sheet assembly 206 to form structural assembly 218 in which first panel 200 and second panel 202 are in a cured form (operation 1500). The process places an adhesive in a group of joint cavities in a structural assembly (operation 1502). Structural assembly 218 may comprise first panel 200, second panel 202, first uncured portion 214 in first face sheet assembly 204, and second uncured portion 216 in second face sheet assembly 206.

The process cures structural assembly 218 to fabricate composite structure 102 (operation 1504). Adhesive 118 expands to fill each of the group of joint cavities 114 during curing of structural assembly 116 (operation 1506). The process terminates thereafter.

In this illustrative example, adhesive 118 is located in joint cavities 220 as defined by first panel 200, second panel 202, first uncured portion 214 of first face sheet assembly 204 and second uncured portion 216 of second face sheet assembly 206. Adhesive 118 expands during curing to fill joint cavities 220 in a manner that reduces or eliminates gaps or voids within joint cavities 220 in forming integrated joints 224.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram. For example, operations such as bagging components and applying a vacuum are not shown but may be included in the process to fabricate composite structures.

Figure 16:
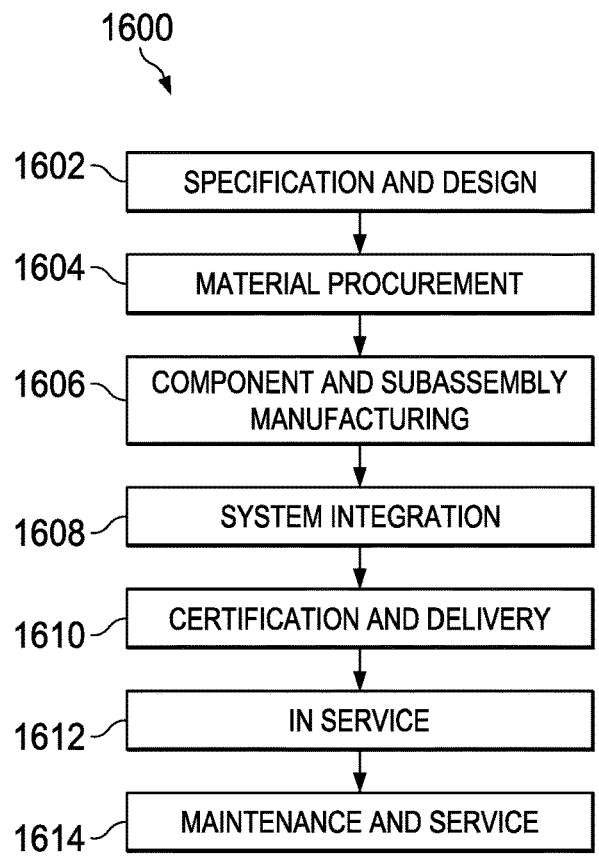
FIG. 16 is an illustration of an aircraft manufacturing and service method in accordance with an illustrative embodiment.
Figure 17:
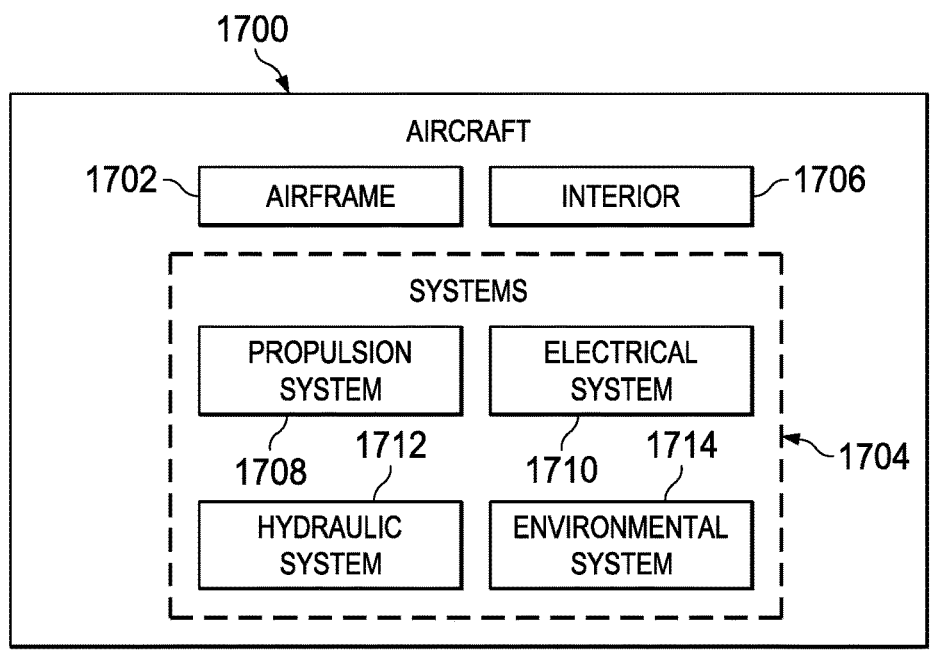
FIG. 17 is an illustration of an aircraft in which an illustrative embodiment may be implemented.

The illustrative embodiments of the present disclosure may be described in the context of aircraft manufacturing and service method 1600 as shown in FIG. 16 and aircraft 1700 as shown in FIG. 17. Turning first to FIG. 16, an illustration of an aircraft manufacturing and service method is depicted in accordance with an illustrative embodiment. During pre-production, aircraft manufacturing and service method 1600 may include specification and design 1602 of aircraft 1700 in FIG. 16 and material procurement 1604. As depicted, material procurement 1604 may include obtaining composite structures, such as composite structure 102 in FIG. 1.

During production, component and subassembly manufacturing 1606 and system integration 1608 of aircraft 1700 in FIG. 17 takes place. Thereafter, aircraft 1700 in FIG. 17 may go through certification and delivery 1610 in order to be placed in service 1612. While in service 1612 by a customer, aircraft 1700 in FIG. 17 is scheduled for routine maintenance and service 1614, which may include modification, reconfiguration, refurbishment, or other maintenance and service.

Each of the processes of aircraft manufacturing and service method 1600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 17, an illustration of an aircraft is depicted in which an illustrative embodiment may be implemented. In this example, aircraft 1700 is produced by aircraft manufacturing and service method 1600 in FIG. 16 and may include airframe 1702 with plurality of systems 1704 and interior 1706. In the illustrative examples, composite structures such as composite structure 102 shown in block form in FIG. 1 and FIG. 2 may be used to implement one or more structures or components within airframe 1702 and one or more structures or monuments within interior 1706.

Examples of systems 1704 include one or more of propulsion system 1708, electrical system 1710, hydraulic system 1712, and environmental system 1714. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 1600 in FIG. 16. For example, composite structure 102 may be fabricated during component and subassembly manufacturing 1606. As another example, composite structure 102 may be fabricated for use during maintenance and service 1614. Composite structure 102 shown in FIG. 1 may be a component used in which modification, reconfiguration, refurbishment, and other maintenance or service during maintenance and service 1614.

In one illustrative example, components or subassemblies produced in component and subassembly manufacturing 1606 in FIG. 16 may be fabricated or manufactured in a manner similar to components or subassemblies produced while aircraft 1700 is in service 1612 in FIG. 16. As yet another example, one or more apparatus embodiments, method embodiments, or a combination thereof may be utilized during production stages, such as component and subassembly manufacturing 1606 and system integration 1608 in FIG. 16. For example, composite structure 102 in FIG. 1 may be used in system integration 1608 in FIG. 16. One or more apparatus embodiments, method embodiments, or a combination thereof may be utilized while aircraft 1700 is in service 1612, during maintenance and service 1614 in FIG. 16, or both. The use of a number of the different illustrative embodiments may substantially expedite the assembly of aircraft 1700, reduce the cost of aircraft 1700, or both expedite the assembly of aircraft 1700 and reduce the cost of aircraft 1700.

For example, the amount of time for fabricating composite structure 102 using integrated joints 120 in FIG. 1 may be reduced, as compared to current techniques for creating joints in composite structures. Further, increased structural performance also may be obtained, as well as more desirable aesthetics as compared to composite structures currently manufactured.

Thus, the illustrative embodiments provide a method and apparatus for composite structures with integrated joints. In one illustrative example, a method is present for fabricating a composite structure. An adhesive is placed in a group of joint cavities in a structural assembly comprising a first face sheet assembly, core sections, and a second face sheet assembly. The structural assembly is cured to fabricate the composite structure.

In the illustrative examples, one or more technical solutions are present that overcome a technical problem with currently used joints for joining composite parts to form composite structures. For example, one or more technical solutions may provide a technical effect of fabricating composite structures in a manner that is at least one of reducing time required to fabricate composite structures, reducing labor, increasing structural performance, increased aesthetics, reduced clean up, or other desirable features for composite structures. Further, the illustrative examples may provide a technical solution in which the technical effect is present in which cured composite parts may be joined to each other with integrated joints.

The description of the different illustrative embodiments has been presented for purposes of illustration and description and is not intended to be exhaustive or limited to the embodiments in the form disclosed.

For example, composite structure 102 as described and shown in FIG. 2 may be applied to form integrated joints 224 with cured face sheets, uncured "green" face sheets, or both cured face sheets and uncured face sheets. For example, first panel 200 and second panel 202 may be flat prefabbed sandwich panels. First panel 200 and second panel 202 may be positioned such that the face sheets in first face sheet assembly 204 and second face sheet assembly 206 and core sections 213 a group of joint cavities 220 that may be filled with an expandable adhesive. In this example, the group of joint cavities 220 may be located at a "T" joint or an "L" joint between first panel 200 and second panel 202.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for fabricating a composite structure, the method comprising:
    defining a shape for the composite structure with a first face sheet;
    placing layers of an adhesive on the first face sheet;
    placing a plurality of core sections on the layers of the adhesive;
    placing layers of the adhesive in each of a group of joint cavities, wherein each of the group of joint cavities is adjacent at least two of the plurality of core sections; and
    placing a second face sheet on the plurality of core sections in which the first face sheet, the plurality of core sections, and the second face sheet define a structural assembly in which the group of joint cavities are present; and
    curing the structural assembly with the layers of the adhesive in each of the group of joint cavities to fabricate the composite structure in which the layers of the adhesive in each of the group of joint cavities fills each of the group of joint cavities and contacts both of the at least two of the plurality of core sections that are adjacent the layers of the adhesive when the layers of the adhesive are cured, wherein the layers of the adhesive in each of the group of joint cavities only contact edges of the at least two of the core sections and do not penetrate interiors of the at least two of the plurality of core sections.

2. The method of claim 1, wherein the adhesive is selected from at least one of a nonflowing adhesive that does not flow during curing, a foaming adhesive, or an expanding adhesive.

3. The method of claim 1 further comprising:
expanding the adhesive to fill each of the group of joint cavities with the adhesive during curing of the structural assembly.

4. The method of claim 1,
wherein the first face sheet is comprised of a first group of plies and the second face sheet is comprised of a second group of plies.

5. The method of claim 4, wherein a first ply in the first group of plies is comprised of at least one of a carbon fiber reinforced polymer, a carbon fiber reinforced thermoplastic polymer, a carbon fiber reinforced thermoset polymer, a glass fiber reinforced thermoplastic polymer, or a glass fiber reinforced thermoset polymer and a second ply in the second group of plies is comprised of at least one of the carbon fiber reinforced polymer, the carbon fiber reinforced thermoplastic polymer, the carbon fiber reinforced thermoset polymer, the glass fiber reinforced thermoplastic polymer, or the glass fiber reinforced thermoset polymer.

6. The method of claim 1, wherein defining the shape for the composite structure with the first face sheet comprises:
creating the first face sheet with a three-dimensional shape having contours.

7. The method of claim 1, wherein the plurality of core sections are from at least one of a honeycomb core, a closed cell foam core, and an open cell foam core.

8. The method of claim 1, wherein the composite structure is selected from a group consisting of an aircraft structure, a control surface, a monument for an aircraft cabin, an overhead stowage bin, a closet, a lavatory, a galley, and a cabinet.

9. The method of claim 1, wherein the shape is a three-dimensional shape.

10. A method for fabricating a composite structure, the method comprising:
placing layers of adhesive in each of a group of joint cavities in a structural assembly comprising a first face sheet assembly, a plurality of core sections, and a second face sheet assembly, wherein each of the group of joint cavities is adjacent at least two of the plurality of core sections; and
curing the structural assembly to fabricate the composite structure in which the layers of adhesive in each of the group of joint cavities fills each of the group of joint cavities and contacts the at least two of the plurality of core sections that are adjacent the layers of adhesive when the layers of adhesive are cured,
wherein the layers of the adhesive in each of the group of joint cavities only contacts edges of the at least two of the plurality of core sections and does not penetrate interiors of the at least two of the plurality of core sections.

11. The method of claim 10 further comprising:
defining a three-dimensional shape for the composite structure using the first face sheet; and placing the second face sheet on the plurality of the core sections in which the first face sheet, the plurality of core sections, and the second face sheet form the structural assembly in which the group of joint cavities are present.

12. The method of claim 10 further comprising:
positioning a first panel, a second panel, a first uncured portion in the first face sheet assembly and a second uncured portion in the second face sheet assembly to form the structural assembly in which the first panel and the second panel are in a cured form and contain the core sections.

13. The method of claim 12, wherein placing layers of the adhesive in each of the group of joint cavities in the structural assembly comprising the first face sheet assembly, the plurality of core sections, and the second face sheet assembly comprises:
placing the adhesive in the group of joint cavities located at a group of joints selected from at least one of a "T" joint or an "L" joint between the first panel and the second panel.

14. The method of claim 10, wherein the layers of adhesive are selected from at least one of a nonflowing adhesive that does not flow during curing, a foaming adhesive, or an expanding adhesive.

15. The method of claim 10 further comprising:
positioning the first face sheet assembly, the plurality of core sections, and the second face sheet assembly to define the group of joint cavities, wherein the first face sheet assembly is comprised of a first group of plies and the second face sheet assembly is comprised of a second group of plies.

16. The method of claim 10 further comprising:
expanding the layers of adhesive to fill each of the group of joint cavities with the layers of adhesive during curing of the structural assembly.

17. The method of claim 10 further comprising:
positioning the first face sheet assembly, the plurality of core sections, and the second face sheet assembly to define the group of joint cavities, wherein the first face sheet assembly is comprised of a first group of plies and the second face sheet assembly is comprised of a second group of plies, and wherein a first ply in the first group of plies is comprised of at least one of a carbon fiber reinforced polymer, a carbon fiber reinforced thermoplastic polymer, a carbon fiber reinforced thermoset polymer, a glass fiber reinforced thermoplastic polymer, or a glass fiber reinforced thermoset polymer and a second ply in the second group of plies is comprised of at least one of the carbon fiber reinforced polymer, the carbon fiber reinforced thermoplastic polymer, the carbon fiber reinforced thermoset polymer, the glass fiber reinforced thermoplastic polymer, or the glass fiber reinforced thermoset polymer.

18. The method of claim 10 further comprising:
positioning the first face sheet assembly, the plurality of core sections, and the second face sheet assembly to define the group of joint cavities wherein the first face sheet assembly is comprised of a first group of plies and the second face sheet assembly is comprised of a second group of plies.

19. The method of claim 10 further comprising:
positioning the first face sheet assembly, the plurality of core sections, and the second face sheet assembly to define the group of joint cavities, wherein the plurality of core sections are selected from at least one of a honeycomb core, a closed cell foam core, or an open cell foam core.

20. The method of claim 10, wherein the composite structure is selected from a group consisting of an aircraft structure, a control surface, a monument for an aircraft cabin, an overhead stowage bin, a closet, a lavatory, a galley, and a cabinet.

21. A method for fabricating a composite panel sandwich structure, the method comprising:
   defining a three-dimensional shape for a composite structure with a first face sheet in which the first face sheet is comprised of a first group of plies;
   placing layers of an adhesive on the first face sheet;
   placing a plurality of core sections on the layers of the adhesive in which the plurality of core sections are from at least one of a honeycomb core, a closed cell foam core, and an open cell foam core;
   placing layers of the adhesive in each of a group of joint cavities, wherein each of the group of joint cavities is adjacent at least two of the plurality of core sections, wherein the adhesive is selected from at least one of a nonflowing adhesive that does not flow during curing, a foaming adhesive, or an expanding adhesive;
   placing a second face sheet on the plurality of core sections in which the second face sheet is comprised of a second group of plies, and the first face sheet, the plurality of core sections, and the second face sheet, define a structural assembly in which the group of joint cavities are present and in which a first ply in the first group of plies is comprised of at least one of a carbon fiber reinforced polymer, a carbon fiber reinforced thermoplastic polymer, a carbon fiber reinforced thermoset polymer, a glass fiber reinforced thermoplastic polymer, or a glass fiber reinforced thermoset polymer and a second ply in the second group of plies is comprised of at least one of the carbon fiber reinforced polymer, the carbon fiber reinforced thermoplastic polymer, the carbon fiber reinforced thermoset polymer, the glass fiber reinforced thermoplastic polymer, or the glass fiber reinforced thermoset polymer; and
   curing the structural assembly with the layers of the adhesive in each of the group of joint cavities to fabricate the composite structure in which the layers of the adhesive in each of the group of joint cavities expands to fill each of the group of joint cavities and contacts both of the at least two of the plurality of core sections that are adjacent the layers of the adhesive when the layers of the adhesive are cured,
   wherein the layers of the adhesive in each of the group of joint cavities only contact edges of the at least two of the core sections and do not penetrate interiors of the at least two of the core sections.

22. The method of claim 21, wherein the composite panel sandwich structure is selected from a group consisting of an aircraft structure, a control surface, a monument for an aircraft cabin, an overhead stowage bin, a closet, a lavatory, a galley, and a cabinet.

23. A method for fabricating a composite panel sandwich structure, the method comprising:
   positioning a first panel, a second panel, and a first uncured portion in a first face sheet assembly and a second uncured portion in a second face sheet assembly to form a structural assembly, in which the first panel and the second panel are in a cured form and contain a plurality of core sections, in which a first face sheet is comprised of a first group of plies and a second face sheet is comprised of a second group of plies and in which a first ply in the first group of plies is comprised of at least one of a carbon fiber reinforced polymer, a carbon fiber reinforced thermoplastic polymer, a carbon fiber reinforced thermoset polymer, a glass fiber reinforced thermoplastic polymer, or a glass fiber reinforced thermoset polymer and a second ply in the second group of plies is comprised of at least one of the carbon fiber reinforced polymer, the carbon fiber reinforced thermoplastic polymer, the carbon fiber reinforced thermoset polymer, the glass fiber reinforced thermoplastic polymer, or the glass fiber reinforced thermoset polymer, and in which the plurality of core sections are selected from at least one of a honeycomb core, a closed cell foam core, or an open cell foam core;
   placing layers of an adhesive in each of a group of joint cavities located in the structural assembly in which the adhesive is selected from at least one of a nonflowing adhesive that does not flow during curing, a foaming adhesive, or an expanding adhesive, wherein each of the group of joint cavities is adjacent at least two of the plurality of core sections; and
   curing the structural assembly together with the layers of the adhesive in each of the group of joint cavities to fabricate the composite panel sandwich structure in which the layers of the adhesive in each of the group of joint cavities expands to fill each of the group of joint cavities and contacts both of the at least two of the plurality of core sections that are adjacent the adhesive when the adhesive is cured,
   wherein the adhesive in each of the group of joint cavities only contacts edges of the at least two of the plurality of core sections and does not penetrate interiors of the at least two of the plurality of core sections.

24. The method of claim 23, wherein the composite panel sandwich structure is selected from a group consisting of an aircraft structure, a control surface, a monument for an aircraft cabin, an overhead stowage bin, a closet, a lavatory, a galley, and a cabinet.

25. A method for fabricating a composite structure, the method comprising:
   forming a first face sheet with contours to define a three-dimensional shape;
   placing layers of an adhesive on the first face sheet;
   placing a plurality of core sections on the layers of the adhesive;
   placing a second face sheet on the plurality of core sections in which the second face sheet has a shape that corresponds to the three-dimensional shape defined by the first face sheet, and in which the first face sheet, the plurality of core sections, and the second face sheet define a structural assembly in which a group of joint cavities are present;
   placing layers of the adhesive in each of a group of joint cavities, wherein each of the group of joint cavities is adjacent at least two of the plurality of core sections; and
   curing the structural assembly with the adhesive in each of the group of joint cavities to fabricate the composite structure in which the layers of the adhesive in each of the group of joint cavities expands to fill each of the group of joint cavities and contacts both of the at least two of the plurality of core sections that are adjacent the layers of the adhesive when the layers of the adhesive are cured,
   wherein the layers of the adhesive in each of the group of joint cavities only contact edges of the at least two of the core sections and do not penetrate interiors of the at least two of the plurality of core sections.

26. A method for fabricating a composite structure, the method comprising:
defining a shape for the composite structure with a first face sheet;
placing layers of an adhesive on the first face sheet;
placing a plurality of core sections on the layers of the adhesive;
placing layers of the adhesive in each of a group of joint cavities, wherein each of the group of joint cavities is adjacent to at least two of the plurality of core sections; and
placing a mold on the plurality of core sections in which the first face sheet, the plurality of core sections, and the mold define a structural assembly in which the group of joint cavities are present; and
curing the structural assembly with the layers of the adhesive in each of the group of joint cavities to fabricate the composite structure in which the layers of the adhesive in each of the group of joint cavities fills each of the group of joint cavities and contacts both of the at least two of the plurality of core sections that are adjacent the layers of the adhesive when the layers of the adhesive are cured,
wherein the layers of the adhesive in each of the group of joint cavities only contact edges of the at least two of the core sections and do not penetrate interiors of the at least two of the plurality of core sections.

27. The method of claim 26, wherein the adhesive is selected from at least one of a nonflowing adhesive that does not flow during curing, a foaming adhesive, or an expanding adhesive.

28. The method of claim 26 further comprising:
expanding the adhesive to fill each of the group of joint cavities with the adhesive during curing of the structural assembly.

29. The method of claim 26, wherein the first face sheet is comprised of a first group of plies and the mold is comprised of a second group of plies.

30. The method of claim 29, wherein a first ply in the first group of plies is comprised of at least one of a carbon fiber reinforced polymer, a carbon fiber reinforced thermoplastic polymer, a carbon fiber reinforced thermoset polymer, a glass fiber reinforced thermoplastic polymer, or a glass fiber reinforced thermoset polymer and a second ply in the second group of plies is comprised of at least one of the carbon fiber reinforced polymer, the carbon fiber reinforced thermoplastic polymer, the carbon fiber reinforced thermoset polymer, the glass fiber reinforced thermoplastic polymer, or the glass fiber reinforced thermoset polymer.

31. The method of claim 26, wherein defining the shape for the composite structure with the first face sheet comprises:
creating the first face sheet with a three-dimensional shape having contours.

32. The method of claim 26, wherein the plurality of core sections are from at least one of a honeycomb core, a closed cell foam core, and an open cell foam core.

33. A method for fabricating a composite panel sandwich structure, the method comprising:
defining a three-dimensional shape for a composite structure with a first face sheet in which the first face sheet is comprised of a first group of plies;
placing layers of an adhesive on the first face sheet;
placing a plurality of core sections on the layers of the adhesive in which the plurality of core sections are from at least one of a honeycomb core, a closed cell foam core, and an open cell foam core;
placing layers of the adhesive in each of a group of joint cavities, wherein each of the group of joint cavities is adjacent to at least two of the plurality of core sections, wherein the adhesive is selected from at least one of a nonflowing adhesive that does not flow during curing, a foaming adhesive, or an expanding adhesive;
placing a mold on the plurality of core sections in which the mold is comprised of a second group of plies, and the first face sheet, the plurality of core sections, and the mold, define a structural assembly in which the group of joint cavities are present and in which a first ply in the first group of plies is comprised of at least one of a carbon fiber reinforced polymer, a carbon fiber reinforced thermoplastic polymer, a carbon fiber reinforced thermoset polymer, a glass fiber reinforced thermoplastic polymer, or a glass fiber reinforced thermoset polymer and a second ply in the second group of plies is comprised of at least one of the carbon fiber reinforced polymer, the carbon fiber reinforced thermoplastic polymer, the carbon fiber reinforced thermoset polymer, the glass fiber reinforced thermoplastic polymer, or the glass fiber reinforced thermoset polymer; and
curing the structural assembly with the layers of the adhesive in each of the group of joint cavities to fabricate the composite structure in which the layers of the adhesive in each of the group of joint cavities expands to fill each of the group of joint cavities and contacts both of the at least two of the plurality of core sections that are adjacent the layers of the adhesive when the layers of the adhesive are cured,
wherein the layers of the adhesive in each of the group of joint cavities only contact edges of the at least two of the core sections and do not penetrate interiors of the at least two of the core sections.

34. The method of claim 33, wherein the composite structure is selected from a group consisting of an aircraft structure, a control surface, a monument for an aircraft cabin, an overhead stowage bin, a closet, a lavatory, a galley, and a cabinet.

* * * * *